United States Patent [19]

Nelson

[11] 4,348,499

[45] Sep. 7, 1982

[54] HEAT RESISTANT LOW SHRINK POLYESTER RESINS

[75] Inventor: Donald L. Nelson, Lake Jackson, Tex.

[73] Assignee: The Dow Chemical Company, Midland, Mich.

[21] Appl. No.: 182,284

[22] Filed: Aug. 28, 1980

Related U.S. Application Data

[63] Continuation-in-part of Ser. No. 82,245, Oct. 5, 1979, abandoned.

[51] Int. Cl.$^3$ .................. C08G 63/52; C08L 67/06
[52] U.S. Cl. ...................................... 525/49; 525/10; 528/303; 528/306
[58] Field of Search ............... 528/298, 306, 303; 525/43, 49, 169, 10

[56] References Cited

U.S. PATENT DOCUMENTS

| | | | |
|---|---|---|---|
| 3,347,806 | 10/1967 | Zimmermann | 260/22 CB |
| 3,883,612 | 5/1975 | Pratt et al. | 525/170 |
| 3,986,992 | 10/1976 | Canning et al. | 260/22 CB |
| 4,029,848 | 6/1977 | Nelson | 260/22 CB |
| 4,148,765 | 4/1979 | Nelson | 260/22 CB |
| 4,233,432 | 11/1980 | Curtis, Jr. | 528/298 |

OTHER PUBLICATIONS

Zimmerman et al., "Die Modifizierung ungesättigter Polyester mit Dicyclopentadien" Fette-Seifen-Anstrichmittel 66, #9, 670–678, 1964.

Primary Examiner—Allan Lieberman
Attorney, Agent, or Firm—B. G. Colley

[57] ABSTRACT

Polyester resins are produced from unsaturated dicarboxylic anhydrides which are modified with a $C_{10}$ hydrocarbon concentrate. They are superior to the known resins made by the hydrolysis method containing the hydrocarbon concentrate in that the dicarboxylic anhydrides used in the preparation of the resins are hydrolyzed with an amount of water always less than the amount of maleic anhydride and/or hydrocarbon on a molar basis. After the hydrocarbon addition reaction of the in situ generated acid, the reaction is heated to 140° C. to 185° C. in order to generate cyclopentadiene or similar $C_5$ hydrocarbons and form endomethylene tetrahydrophthalic anhydride (carbic anhydride) or other similar Diels-Alder products from the remaining unreacted maleic anhydride and hydrocarbon, generally prior to the addition of other resin forming chemical intermediates e.g. polyols.

14 Claims, No Drawings

HEAT RESISTANT LOW SHRINK POLYESTER RESINS

CROSS REFERENCE TO RELATED APPLICATIONS

This application is a continuation-in-part of Ser. No. 082,245 filed Oct. 5, 1979, now abandoned.

BACKGROUND OF THE INVENTION

This invention relates to polyester resins containing an effective amount of $C_{10}$ hydrocarbon concentrate i.e. dicyclopentadiene, or other $C_5$ codimers. The polyester resins are prepared by the hydrolysis of unsaturated dicarboxylic acid anhydrides and the in situ generation of Diels-Alder products such as carbic anhydride.

More specifically, the invention relates to polyester resins produced by reacting a polyol, an olefinically unsaturated dicarboxylic anhydride, water, and an effective amount of $C_{10}$ hydrocarbon concentrate wherein the anhydride and water are first reacted, the $C_{10}$ concentrate is reacted, carbic anhydride is formed by heating and the polyol is finally reacted into the mixture.

It is well known from the report by P. L. Smith, et al. "The Use of Dicyclopentadiene in Polyesters", Proceedings of the 22nd Annual Technical Conference S.P.I., Reinforced Plastics Division, Washington, D.C. (1967) and the article by R. Zimmerman, et al. "Modification of Unsaturated Polyesters with Dicyclopentadiene", Fette-Seifen-Anstrichmittel 66, #9, 670–678 (1976), and U.S. Pat. No. 3,347,806 that polyesters can be modified with a concentrated dicyclopentadiene extract.

It is also known from U.S. Pat. No. 4,148,765 dated Apr. 10, 1979, that polyester resins containing dicyclopentadiene can be improved by hydrolysis of the unsaturated dicarboxylic anhydrides used therein prior to the reaction of the dicyclopentadiene.

Low profile polyester resins are known from U.S. Pat. No. 3,883,612 dated May 13, 1975, and U.S. Pat. No. 3,986,992 dated Oct. 19, 1976. However, these polyesters depend upon polymer additives to give the low profile or low shrink properties.

SUMMARY OF THE INVENTION

It has now been found that polyester resins modified with $C_{10}$ hydrocarbon concentrates can be prepared using water during the reaction sequence with the additional step of heating to generate carbic anhydride. Surprisingly, the resins thus prepared are better than similar resins prepared with the use of water in that the resins when cured with ethylenically unsaturated monomers have less shrinkage, less weight loss on heating, and less loss of physical properties such as flex strength and flex modulus.

The resins of this invention are prepared by the steps comprising (A) reacting an alpha, beta-ethylenically unsaturated dicarboxylic anhydride with from 0.1 to 0.9 moles (preferably 0.45 to 0.65 moles) of water per mole of anhydride at a temperature ranging from 30° C. to 150° C. (preferably 70° C. to 90° C.) for a period of time to complete the anhydride hydrolysis, (B) adding about 0.2 to 1.3 moles (preferably 0.6 to 0.8 moles) of a $C_{10}$ hydrocarbon concentrate per mole of anhydride to the reaction mixture from step A, (C) heating the mixture from step B at a temperature ranging from 80° C. to 130° C. (preferably 95° C. to 110° C.) for a period of time sufficient to carry out the addition reaction, (D) heating the reaction product of step C at a temperature ranging from 140° C. to 185° C. (preferably 155° C. to 180° C.) for a period of time to complete the Diels-Alder reaction, (E) adding about 0.5 to 1.5 moles (preferably 0.8 to 1.2 moles) of a polyol per mole of anhydride, and (F) heating the mixture of step E at a temperature range from 140° C. to 215° C. (preferably 160° C. to 205° C.) for a time sufficient to produce a polyester resin with an acid number less than 100 (preferably less than 40).

DESCRIPTION OF THE PREFERRED EMBODIMENTS

The polyols used to prepare the resins of this invention are those which are reactive with carboxylic acids and/or anhydrides and may include, for example: ethylene glycol, propylene glycol, diethylene glycol, dipropylene glycol, butanediol, hexanediol, pentaerythritol, triethylene glycol, trimethylol propane, glycerol, tris(2-hydroxyl ethyl) isocyanurate or mixtures thereof. Preferably, the polyols used in this invention are glycols such as ethylene glycol, propylene glycol, and/or dipropylene glycol and/or diethylene glycol.

The unsaturated dicarboxylic anhydrides that can be used include maleic, citraconic, or mixtures thereof.

The $C_{10}$ hydrocarbon concentrate used in this invention is a commercial product generally prepared by dimerizing a crude $C_5$ stream from the cracking of crude mixtures of hydrocarbons as set forth by Gebhart, et al. in U.S. Pat. No. 3,557,239 issued Jan. 19, 1971.

These concentrates have as the main reactive components about 60 to about 99 percent by weight of dicyclopentadiene, about 1 to about 30 percent by weight of the mixed Diels-Alder dimers of diolefins such as butadiene, cis and trans piperylene, isoprene, cyclopentadiene, and methyl cyclopentadiene. The remainder of these concentrates generally comprise benzene, cyclopentene, 1,5-hexadiene and oligomers of the above diolefins.

Examples of some of the dimers which have been identified in these concentrates are the Diels-Alder adducts of two moles of isoprene (isoprene dimers), the adduct of cyclopentadiene and isoprene, the adduct of cyclopentadiene and piperylene, and the like.

If desired, a relatively pure dicyclopentadiene feed, i.e., containing greater than 99% DCPD can be used herein.

The polyesters of this invention are prepared by reacting in a nitrogen atmosphere an alpha, beta ethylenically unsaturated dicarboxylic anhydride, or mixtures thereof, with water.

The reaction is carried out in the presence of about 0.1 to about 0.9 moles water per mole of carboxylic acid anhydride used. The preferred range is about 0.45 to about 0.65 moles water per mole of carboxylic anhydride.

The reactants can be heated to a temperature range from about 30° C. to about 150° C. to complete the hydrolysis reaction.

The reaction mixture is then blended with 0.2 to 1.3 moles of a $C_{10}$ hydrocarbon concentrate per mole of anhydride and heated to a temperature in the range from 80°–130° C. for a period of time from five minutes to one hour in order to effect the $C_{10}$ addition reaction with the unsaturated dicarboxylic acid.

The $C_{10}$ concentrate can be added all at one time or if desired, a major part such as up to two-thirds of the $C_{10}$ hydrocarbons concentrate may be added to the reaction mixture prior to the hydrolysis reaction and the remainder added just before the second heating step.

The reaction mixture is further heated to a higher temperature range from 140° to 185° C. for a period of time from 30 minutes to several hours in order to complete the Diels-Alder reaction. During this second heating step the $C_{10}$ hydrocarbon is cracked to $C_5$ dienes which react with the unsaturated dicarboxylic anhydride to form Diels-Alder products such as endomethylene tetrahydrophthalic anhydride (carbic anhydride) or methyl tetrahydrophthalic anhydride.

The Diels-Alder product further reacts with the polyols and in combination with the $C_{10}$ esters is believed to be responsible for the improved resin properties.

The last step of the process involves adding 0.5 to 1.5 moles of a polyol per mole of anhydride and heating the resin mixture to a temperature range from 140° C. to 215° C. for a period of time ranging from six to fourteen hours or until the polyester resin has an acid number of less than 100 and preferably less than 40.

If desired, the polyol can be added just before the aforementioned second heating step.

Also, additional saturated acids, unsaturated acids, and esters which are suitable for transesterification can be added with the polyol as long as the above 0.5 to 1.5 mole ratio is maintained. Examples of suitable saturated polycarboxylic acids are phthalic acid, isophthalic acid, succinic acid, glutaric acid, adipic acid, pimelic acid, suberic acid, and the like.

Examples of suitable unsaturated polycarboxylic acids are fumaric acid, citraconic acid, itaconic acid, mesaconic acid, glutaconic acid, and the like.

Examples of suitable esters are the methyl or ethyl esters of succinic, glutaric, adipic, pimelic, and suberic acids, and the like.

The resin is then recovered and blended with an ethylenically unsaturated monomer copolymerizable with the unsaturated polyester polymers to form a blend wherein the weight ratio of polyester to monomer is in the range from about 5:1 to about 1:2. Such ethylenically unsaturated monomers are well known and include: styrene, chlorostyrene, vinyl toluene, divinyl benzene, dicyclopentadiene alkenoate, acrylic and methacrylic acid, diallyl phthalate and like unsaturated monomers or mixtures thereof.

A small amount of an inhibitor such as tertiary butyl catechol, hydroquinone, or the like may be added to this mixture.

The final blend is a crosslinkable polyester composition which is useful to make laminates, castings or coatings.

Laminates can be made by mixing into the crosslinkable composition, free radical forming catalysts in known amounts and adding this mixture to a suitable fibrous reinforcement such as carbon fibers, fibrous glass, or inorganic fibers.

Examples of these catalysts are benzoyl peroxide, tertiary butyl peroxide, methylethyl ketone peroxide and the like. It is frequently of value to add accelerators such as cobalt naphthenate, dimethyl aniline, and the like.

The polyester resin is rolled, sprayed or impregnated into the fibrous reinforcement such as fibrous glass and cured in a manner well known in the art. When fibrous glass is used, it can be in any form such as chopped strands, filaments, glass ribbons, glass yarns, or reinforcing mats.

The following examples are presented to illustrate but not limit the invention.

EXAMPLE 1

To a reaction flask equipped with a stirrer, heating source with controller, thermowell, inert gas sparge tube and a reflux condenser was added 196.1 gms. (2.0 moles) of maleic anhydride. The temperature of the maleic anhydride after melting was 70° C. 19.8 gms. (1.1 moles) of water was added. After a 5 minute hydrolysis period, about ¼ of the 192 gms (1.4 moles) of a 96.4% reactive $C_{10}$ hydrocarbon concentrate containing about 84% by weight of dicyclopentadiene (DCPD), were added. An immediate exotherm to 83° C. was observed. After 10 minutes DCPD addition was resumed over a 4-minute period so that all $C_{10}$ hydrocarbon (192 gms) was added over a 14 minute period. During this time the temperature remained between 80° C. and 85° C. The controller was set at 105° C. and held for 20 minutes at which time the controller was set at 173° C. A reaction time of 1 hour and 47 minutes was allowed at that temperature.

The reaction mass was cooled to 160° C. at which point 141 gms (1.85 moles) of propylene glycol were added. The reflux condenser was switched to hot water, a Dean Stark trap employed and the nitrogen sparge started. After 2 hours at 160° C., the temperature controller was set at 200° C. The reaction was allowed to proceed to a final acid number of 26.

The temperature was reduced to 150° C. at which point 100 ppm hydroquinone was added. The resin was later blended to a 43% styrene level.

EXAMPLE 2

To a reaction flask equipped as in example 1 was added 392.2 gms (4.0 moles) of maleic anhydride which was heated to a melt temperature of 70° C. 39.6 gms (2.2 moles) of water was added. Over a 15 minute period 383.4 gms (2.8 moles) of a 96.4% reactive $C_{10}$ hydrocarbon concentrate containing about 84% DCPD was added. The exotherm was controlled to a maximum of 125° C. Immediately upon completion of the hydrocarbon addition, the controller was set at 173° C. A slight exotherm to 175° C. was observed. After 1 hour and 30 minutes the reaction mass was cooled to 160° C. and water removal conditions as described in Example 1 established. 281.6 (3.7 moles) of propylene glycol was added and allowed to react at 160° C. for 2 hours. At this point the temperature was set at 200° C. and the resin cooked to an acid number of 24.

The temperature was then reduced to 150° C. and 100 ppm hydroquinone added. The resin was later blended to a 43% styrene level.

EXAMPLE 3

The following reactants were used in a method to duplicate the cook schedule as precisely as possible in Example 2.

392.2 gms (4.0 moles) maleic anhydride
39.6 gms (2.2 moles) water
383.4 gms (2.8 moles) 96.4% reactive $C_{10}$ hydrocarbon concentrate (84% DCPD)
230.0 gms (3.7 moles) ethylene glycol The resin was cooked to an acid number of 25, cooled to 150° C., at which point was added 100 ppm hydroquinone. The resin was later blended with 43% styrene.

EXAMPLE 4

To a reaction flask equipped as in Example 1 was added 490 gms (5.0 moles) maleic anhydride which was heated to 70° C. 36 gms (2 moles) of water was added. After 10 minutes about 200 cc of the total 941.9 gms (7.0 moles) of a 98.1% reactive $C_{10}$ hydrocarbon concentrate was added. After an additional 24 minutes, 36 gms (2 moles) of water was added. After 16 minutes, slow addition of the remaining hydrocarbon was conducted over a 40 minute period. After a 2 hour cook at 125° C., 204.9 gms (3.3 moles) of ethylene glycol and 98 gms (1.0 moles) of maleic anhydride were added. The reaction temperature was set at 160° C. for 2 hours. The reaction temperature was then set at 200° C. and cooked to an acid number of 32. The reaction was cooled to 150° C. and 0.1666 gms of hydroquinone was added.

A 43% styrene solution catalyzed with 2% benzoyl peroxide had a 180° F. SPI gel time of 5 minutes, a cure time of 9.6 minutes and a maximum exotherm of 193.5° C.

A 30% styrene solution was catalyzed with 1% by weight benzoyl peroxide (BPO) or with 1% by weight methyl ethyl ketone peroxide (MEK) and 0.1% cobalt naphthenate and cast into bars which were tested. The following results were obtained.

|  | Catalyst | Initial | Time at 210° C. 48 hrs. | 240 hrs. |
|---|---|---|---|---|
| HDT, °C. | MEK | 66 | 110 | 146 |
| Flex Strength, (psi) | BPO | 10,527 | 14,608 | 10,463 |
| Flex modulus (psi × 10³) | BPO | 612 | 578 | 575 |
| Percent Heat Shrinkage Control* | MEK |  | 0.59 | 0.39 |
| Percent Heat Shrinkage | BPO |  | 0.62 | 1.85 |

*A commercial isophthalic polyester resin made with 30% styrene under the same conditions with BPO.

EXAMPLE 5

To a reaction flask equipped as in Example 1 was added 392.2 gms (4.0 moles) of maleic anhydride which was heated at 70° C. Then 39.6 gms (2.2 moles) of water was added. After 5 minutes, 299.7 gms of a 96.9% reactive $C_{10}$ hydrocarbon concentrate (2.2 moles) was added over a 23 minute period. After a 15 minute dwell at 113° C., 122.6 gms (0.9 moles) of the same $C_{10}$ hydrocarbon was added over a 13 minute period. The reaction temperature was held at 173° C. for 1 hour and 32 minutes at which point 203.7 gms (3.27 moles) of ethylene glycol was added. The reaction temperature was set at 160° C. for about 2 hours. The reaction temperature was then set at 205° C. and cooked to an acid number of 27. The reaction mass was cooled to 150° C. and 100 ppm (based on remaining solids) of hydroquinone was added.

When a 30% styrene solution was catalyzed with 1% benzoyl peroxide, the product had a 180° F. SPI gel time of 4.3 minutes, a cure time of 7.3 minutes and a maximum exotherm of 177° C.

The same 30% styrene solution was cured with 1.0% MEK peroxide and 0.1% cobalt naphthenate 6%.

|  | Initial | Time at 210° C. 48 hrs. | 240 hrs. |
|---|---|---|---|
| HDT °C. | 90 | 132 | 152 |
| Percent Heat Shrinkage | — | 0.19 | 0.19 |

The same 30% styrene solution was cured with 1.0% benzoyl peroxide.

|  | Initial | Time at 210° C. 48 hrs. | 240 hrs. |
|---|---|---|---|
| Flex. Strength psi | 12,946 | 16,245 | 17,387 |
| Flex. modulus (psi × 10³) | 621 | 562 | 561 |

CONTROL 1

To a reactor equipped as in example 1 were added 235.4 gms (2.4 moles) maleic anhydride and 46.8 gms (2.6 moles) water. The contents were heated to 90° C. 188.8 gms (1.4 moles) of a 97.85% reactive $C_{10}$ hydrocarbon concentrate containing about 80% DCPD were added over a 7 minute period. The reactants were held at 90° C. for 43 minutes. At this point, the reflux condenser and Dean Stark trap were engaged. The nitrogen flow was started. 237 gms (1.6 moles) of phthalic anhydride and 289.2 gms (3.8 moles) of propylene glycol were added. The temperature controller was set at 160° C. and held for 1 hour and 30 minutes. The temperature controller was then set at 200° C. and the reaction allowed to proceed to an acid number of 32. Upon cooling to 150° C., 100 ppm hydroquinone was added.

CONTROL 2

To a reaction flask equipped as in Example 1, with a steam condenser in place and a flow of inert gas were added 353 gms (3.6 moles) maleic anhydride, 799.8 gms (5.4 moles) phthalic anhydride, and 739.7 gms (9.7 moles) propylene glycol.

The reactants were heated to 160° C. and held for a two-hour period after which the temperature controller was set at 200° C. The resin was cooked to a final acid number of 37, cooled to 150° C. and 100 ppm hydroquinone added.

The foregoing resins prepared in examples 1-3 and the controls were diluted with 43% styrene and placed in a pycnometer and the densities were measured. Examples 4 and 5 were diluted with 30% styrene.

Samples of each of the diluted resins (30 grams) were cured in test tubes with a room temperature catalyst system comprising 1% by weight methyl ethyl ketone peroxide, 0.1% cobalt naphthenate 6% and 0.1% dimethyl aniline. After curing each sample, the density was measured by the water displacement method.

The change in the density and the percent change for each example is shown in Table 1. Since the cured resins are more dense than the liquid resins, they have less volume and hence Table I shows that the resins of this invention have less shrinkage than the controls.

TABLE I

BULK SHRINKGAGE BASED ON DENSITY AT 23° C.

| Examples | Density of liquid resin | Density of solid resin | Change from solid resin | Percent decrease |
|---|---|---|---|---|
| 1* | 1.0639 | 1.1481 | 0.0842 | 7.91 |
| 2* | 1.0627 | 1.1498 | 0.0871 | 8.20 |
| 3* | 1.0840 | 1.1533 | 0.0693 | 6.39 |
| 4** | 1.0516 | 1.1328 | 0.0812 | 7.77 |
| 5*** | 1.1255 | 1.1744 | 0.0489 | 4.34% |
| Control 1* | 1.0718 | 1.1801 | 0.1083 | 10.10 |
| Control 2* | 1.0909 | 1.1899 | 0.0990 | 9.08 |

*43% by weight styrene solution cured with 1% Lupersol DDM (methyl ethyl ketone peroxide) 0.1% dimethyl aniline and 0.1% cobalt naphthenate, 6%.
**43% by weight styrene solution cured with 2% benzoyl peroxide.
***30% by weight styrene solution cured with 1% benzoyl peroxide.

CONTROL 3

To a resin flask equipped as in the above examples was added 235.4 gms (2.4 moles) of maleic anhydride and 46.8 gms (2.6 moles) of water. The solution was heated to 90° C. at which point 337.3 gms (2.5 moles) of a $C_{10}$ hydrocarbon fraction containing 97.85% of reactive hydrocarbons containing dicyclopentadiene (DCPD) was added over a 5 minute period. The reaction of the DCPD mixture was complete after about 45 minutes in the temperature range of 90° C. to 120° C. The nitrogen flow rate was then increased and the steam condenser attached. Then 237 gms of phthalic anhydride (1.6 moles) and 198.7 gms (3.2 moles) ethylene glycol was added and the temperature control was set at 160° C. After 1½ hours the temperature control was set at 200° C. The reaction was stopped when the acid number reached 30. After cooling to 150° C., 100 ppm hydroquinone was added. When diluted with 43% styrene, the resin exhibited excellent cure properties.

Table II compares both a standard polyester resin (control 2), the above control 3 resin which uses DCPD and the known hydrolysis method, with example 3 of the invention. The resins were made into 3"×1" by ⅛" castings by curing with 1% benzoyl peroxide at 90° C. The superior heat resistance is evidenced in Table II by lower weight loss of the castings of Example 3. The superior retention of physical properties of the castings is evidenced by the flex strength (Table III) and flex modulus (Table IV).

TABLE II

| | (Percent Weight Loss) | | |
|---|---|---|---|
| | Standard | Control 3 | Example 3 |
| Wt. % DCPD | 0 | 19.2 | 22.1 |
| Wt. Loss at 450° F. | | | |
| 1 day | 13.4% | 7.4% | 3.1% |
| 2 days | 20.4% | 8.4% | — |
| 3 days | — | — | 4.1% |
| 7 days | 33.2% | 10.2% | 5.1% |
| 10 days | — | — | 5.4% |
| 14 days | 40.2% | — | — |
| 21 days | 43.1% | 11.9% | 6.5% |

TABLE III

| | (Decrease in Flexural Strength) | | |
|---|---|---|---|
| | Standard | Control 3 | Example 3 |
| Start (psi) | 14,686 | 13,245 | 15,232 |
| After 250 hrs. at 450° F. (psi) | 2,785 | 8,078 | 8,115 |
| % retention after 250 hrs. | 19 | 61 | 53.3 |
| After 500 hrs. (psi) | 884 | 6,006 | 8,134 |

TABLE III-continued

| | (Decrease in Flexural Strength) | | |
|---|---|---|---|
| | Standard | Control 3 | Example 3 |
| % retention after 500 hrs. | 6 | 45.3 | 53.4 |

TABLE IV

| | (Change in Flexural Modulus) | | |
|---|---|---|---|
| | Standard | Control 3 | Example 3 |
| Start (psi) | 651,000 | 499,000 | 550,000 |
| After 250 hrs. (psi) | 236,000 | 543,000 | 581,000 |
| After 500 hrs. (psi) | N.A. | 571,000 | 580,000 |

I claim:

1. A polyester resin which has lower shrinkage during curing and excellent thermal stability which is the product produced by the steps comprising
   (A) reacting an alpha, beta-ethylenically unsaturated dicarboxylic anhydride with from 0.1 to 0.9 moles of water per mole of anhydride at a temperature ranging from 30° C. to 150° C. for a period of time to complete the anhydride hydrolysis,
   (B) adding about 0.2 to 1.3 moles of a $C_{10}$ hydrocarbon concentrate per mole of anhydride to the reaction mixture from step A,
   (C) heating the mixture from step B at a temperature ranging from 80° to 130° C. for a period of time sufficient to carry out the addition reaction,
   (D) heating the reaction product of step C at a temperature ranging from 140° to 185° C. for a period of time to complete the Diels-Alder reaction,
   (E) adding about 0.5 to 1.5 moles of a polyol per mole of anhydride, and
   (F) heating the mixture of step E at a temperature range from 140° C. to 215° C. for a time sufficient to produce a polyester resin.

2. The polyester resin of claim 1 wherein a major portion of said $C_{10}$ concentrate is added to the reaction mixture from Step A and the remaining portion of said $C_{10}$ concentrate is added to the reaction mixture from Step C.

3. The polyester resin of claim 1 wherein the polyol is added before Step D.

4. The polyester resin as set forth in claims 1, 2, or 3 wherein the unsaturated discarboxylic anhydride is maleic anhydride.

5. A crosslinkable polyester blend which comprises the polyester resin of claims 1, 2, or 3 blended with a liquid ethylenically unsaturated monomer wherein the weight ratio of polyester resin to monomer is in the range from about 5:1 to 1:2.

6. The cured polyester blend set forth in claim 5.

7. A polyester resin which has lower shrinkage during curing and excellent thermal stability which is the product produced by the steps comprising
   (A) reacting an alpha, beta-ethylenically unsaturated dicarboxylic anhydride with from 0.1 to 0.9 moles of water per mole of anhydride at a temperature ranging from 70° C. to 90° C. for a period of time to complete the anhydride hydrolysis,
   (B) adding about 0.2 to 1.3 moles of a $C_{10}$ hydrocarbon concentrate per mole of anhydride to the reaction mixture from step A,
   (C) heating the mixture from step B at a temperature ranging from 95° to 110° C. for a period of time sufficient to carry out the addition reaction, (D) heating the reaction product of step C at a temperature ranging from 155° to 180° C. for a period of time to complete the Diels-Alder reaction, (E) adding about 0.5 to 1.5 moles of a polyol per mole of anhydride, and (F) heating the mixture of Step E at a temperature range from 140° C. to 215° C. for a time sufficient to produce a polyester resin.

8. The polyester resin as set forth in claim 7 wherein the unsaturated dicarboxylic anhydride is maleic anhydride.

9. A crosslinkable polyester blend which comprises the polyester resin of claim 7 blended with a liquid ethylenically unsaturated monomer wherein the weight ratio of polyester resin to monomer is in the range from about 5:1 to 1:2.

10. The cured polyester blend set forth in claim 9.

11. A polyester resin which has lower shrinkage during curing and excellent thermal stability which is the product produced by the steps comprising (A) reacting an alpha, beta-ethylenically unsaturated dicarboxylic anhydride with from 0.45 to 0.65 moles of water per mole of anhydride at a temperature ranging from 30° C. to 150° C. for a period of time to complete the anhydride hydrolysis, (B) adding about 0.6 to 0.8 moles of a $C_{10}$ hydrocarbon concentrate per mole of anhydride to the reaction mixture from step A, (C) heating the mixture from step B at a temperature ranging from 80° to 130° C. for a period of time sufficient to carry out the addition reaction, (D) heating the reaction product of step C at a temperature ranging from 140° to 185° C. for a period of time to complete the Diels-Alder reaction, and (E) adding about 0.5 to 1.5 moles of a polyol per mole of anhydride, and (F) heating the mixture of Step E at a temperature range from 140° C. to 215° C. for a time sufficient to produce a polyester resin.

12. The polyester resin as set forth in claim 11 wherein the unsaturated dicarboxylic anhydride is maleic anhydride.

13. A crosslinkable polyester blend which comprises the polyester resin of claim 12 blended with a liquid ethylenically unsaturated monomer wherein the weight ratio of polyester resin to monomer is in the range from about 5:1 to 1:2.

14. The cured polyester blend set forth in claim 13.

* * * * *

UNITED STATES PATENT AND TRADEMARK OFFICE
CERTIFICATE OF CORRECTION

PATENT NO. : 4,348,499
DATED : September 7, 1982
INVENTOR(S) : Donald L. Nelson

It is certified that error appears in the above—identified patent and that said Letters Patent is hereby corrected as shown below:

Col. 1, line 31, change "(1976)" to --(1964)--.

Col. 3, line 3, change "hydrocarbons" to --hydrocarbon--.

Col. 5, line 10, delete the comma "," after $C_{10}$.

Col. 5, line 49, change "at" to --to--.

Col. 7, Table I, in the heading, change "SHRINKGAGE" to --SHRINKAGE--.

Col. 8, line 47, change "discarboxylic" to --dicarboxylic--.

Signed and Sealed this

Twenty-fifth Day of January 1983

[SEAL]

Attest:

GERALD J. MOSSINGHOFF

Attesting Officer

Commissioner of Patents and Trademarks